(12) United States Patent
Parfut et al.

(10) Patent No.: US 8,210,582 B2
(45) Date of Patent: Jul. 3, 2012

(54) ARRANGEMENT FOR REINFORCING A MOTOR VEHICLE BUMPER

(75) Inventors: Sylvain Parfut, Rueil Malmaison (FR); Pierre Cailleaux, Corbreuse (FR)

(73) Assignee: Renault S.A.S., Boulogne Billancourt (FR)

( * ) Notice: Subject to any disclaimer, the term of this patent is extended or adjusted under 35 U.S.C. 154(b) by 0 days.

(21) Appl. No.: 12/921,273

(22) PCT Filed: Mar. 5, 2009

(86) PCT No.: PCT/FR2009/050363

§ 371 (c)(1), (2), (4) Date: Dec. 13, 2010

(87) PCT Pub. No.: WO2009/115740

PCT Pub. Date: Sep. 24, 2009

(65) Prior Publication Data

US 2011/0101715 A1      May 5, 2011

(30) Foreign Application Priority Data

Mar. 5, 2008   (FR) ...................................... 08 51431

(51) Int. Cl.
*B60J 7/00*      (2006.01)
(52) U.S. Cl. ........................................ 293/102; 293/155
(58) Field of Classification Search .................. 293/155, 293/154, 102
See application file for complete search history.

(56) References Cited

U.S. PATENT DOCUMENTS

| | | | |
|---|---|---|---|
| 6,203,078 B1 * | 3/2001 | Karrer | 293/111.1 |
| 7,527,308 B2 * | 5/2009 | Buniewicz et al. | 293/117 |
| 7,552,955 B2 * | 6/2009 | Evans | 293/120 |
| 2006/0145516 A1 | 7/2006 | Yamamoto | |

FOREIGN PATENT DOCUMENTS

| | | |
|---|---|---|
| JP | 03 019752 | 2/1991 |
| JP | 03 120249 | 12/1991 |

OTHER PUBLICATIONS

International Search Report issued Sep. 30, 2009 in PCT/FR09/050363 filed Mar. 5, 2009.

* cited by examiner

*Primary Examiner* — Joseph Pape
(74) *Attorney, Agent, or Firm* — Oblon, Spivak, McClelland, Maier & Neustadt, L.L.P.

(57) ABSTRACT

A structural arrangement of a motor vehicle, of type including a cabin and a loading bed, between which a substantially vertical partition extends, of type including a cabin floor that extends at a first height, and a loading floor of the bed that extends at a second height that differs from the first height of the cabin floor, and of type including a hollow body that stiffens the structure and extends substantially vertically between the first height of the cabin floor and the second height of the loading floor. The hollow body includes two substantially vertical structural elements, and the first structural element is formed by the lower portion of the partition.

8 Claims, 4 Drawing Sheets

ARRANGEMENT FOR REINFORCING A MOTOR VEHICLE BUMPER

BACKGROUND

The present invention concerns an arrangement for reinforcing a motor vehicle bumper, notably an arrangement for reinforcing a motor vehicle bumper in which at least one reinforcing element is welded to crossmember means, this bumper-reinforcing element being adapted to support the vehicle bumper and to absorb substantially longitudinal forces.

Vehicles with a loading bed, usually called pick-ups, include primarily a cabin forming a driving station and a loading bed fastened to this body and forming a loading space. As in all automobile vehicles, a rear bumper is disposed at the rear end of this bed to absorb small impacts with obstacles or vehicles without deforming the structure carrying the bumper. In known manner, reinforcing elements are disposed inside the bumper to prevent deformation of the bumper below a particular longitudinal force.

Moreover, in these vehicles, the loading floor of the bed is at a height greater than that of the driving station, and users must step onto a step to be able to climb onto the bed. If no step has been designed in, users step on the bumper. There is therefore a risk of deforming the bumper because of this vertical force.

BRIEF SUMMARY

The present invention aims to propose a reinforcing arrangement as referred to above able to resist optimally longitudinal and vertical forces. Thus the reinforcing arrangement of the invention is characterized in that the bumper-reinforcing element has an upper portion forming a step region which extends below the upper portion of the bumper and is adapted to absorb substantially vertical forces.

According to various features:
- the reinforcement element is welded to a part forming a lining of the crossmember.
- the reinforcing element is welded to an inclined plane on the crossmember lining so that the fixing plane of the reinforcing element on the end crossmember is slightly inclined relative to a transverse vertical plane.
- the reinforcing element has a substantially U-shaped lower part for attaching the bumper adapted to absorb substantially longitudinal forces.
- at least one reinforcing bracket is disposed inside the bumper reinforcing element to stiffen it, this bracket being welded under the step area of the bumper reinforcement over substantially all its longitudinal dimension and to the face of the attachment part of this bumper reinforcing element that faces the upper part of the bumper reinforcement.
- arrangement includes two bumper reinforcing elements disposed substantially at the lateral ends of the end crossmember.

The invention also concerns an automobile vehicle of the type including the above reinforcing arrangement and in which a number plate is disposed in the space between the two bumper reinforcing elements.

BRIEF DESCRIPTION OF THE DRAWINGS

Other advantages and features of the invention will become apparent on reading the following description, for an understanding of which see the appended figures, in which.

DETAILED DESCRIPTION

Figure 1:
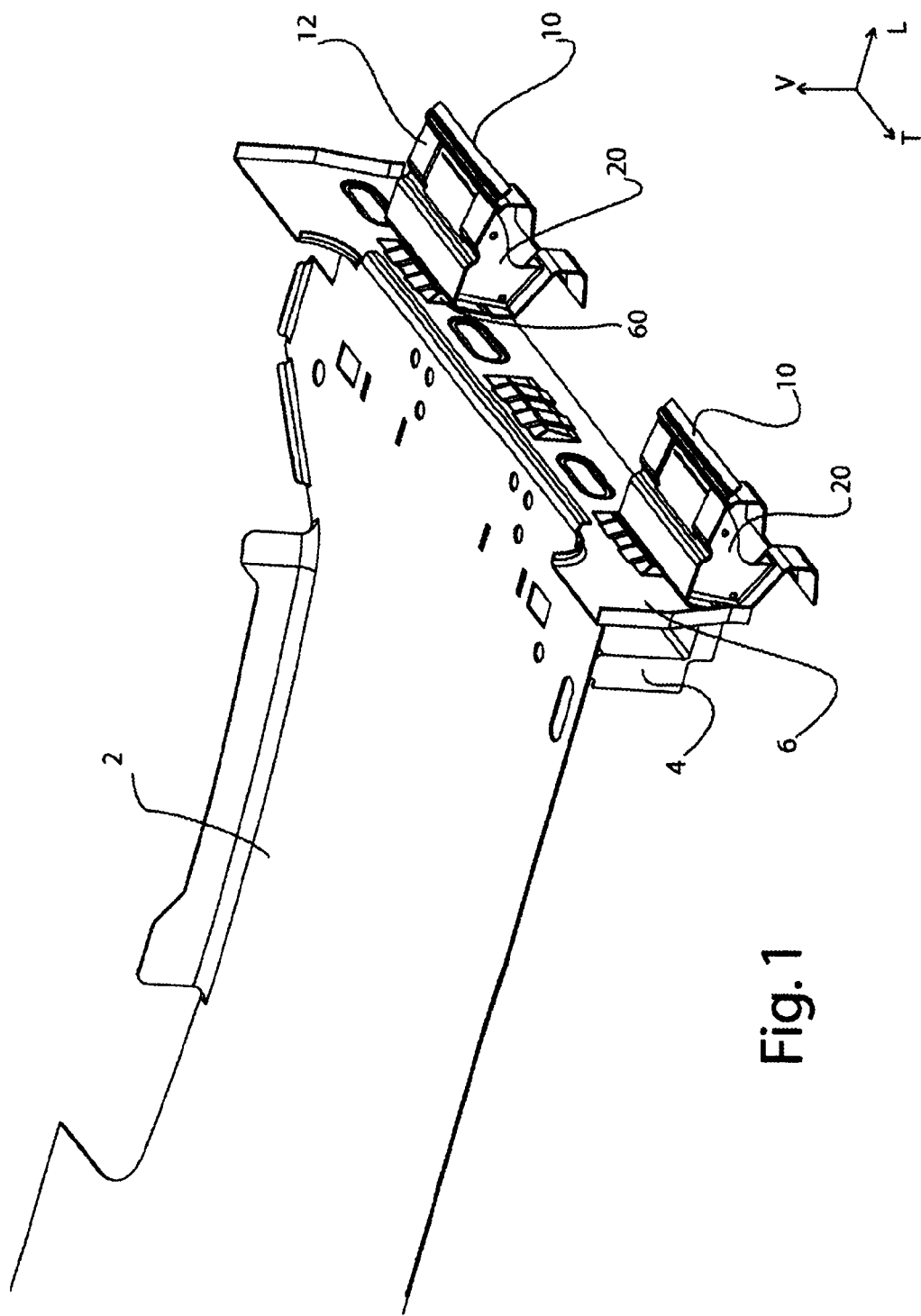
FIG. 1 is a diagrammatic representation of the rear of an automobile vehicle seen from the rear right-hand side of the vehicle on which are disposed bumper reinforcing elements of the invention.
Figure 2:
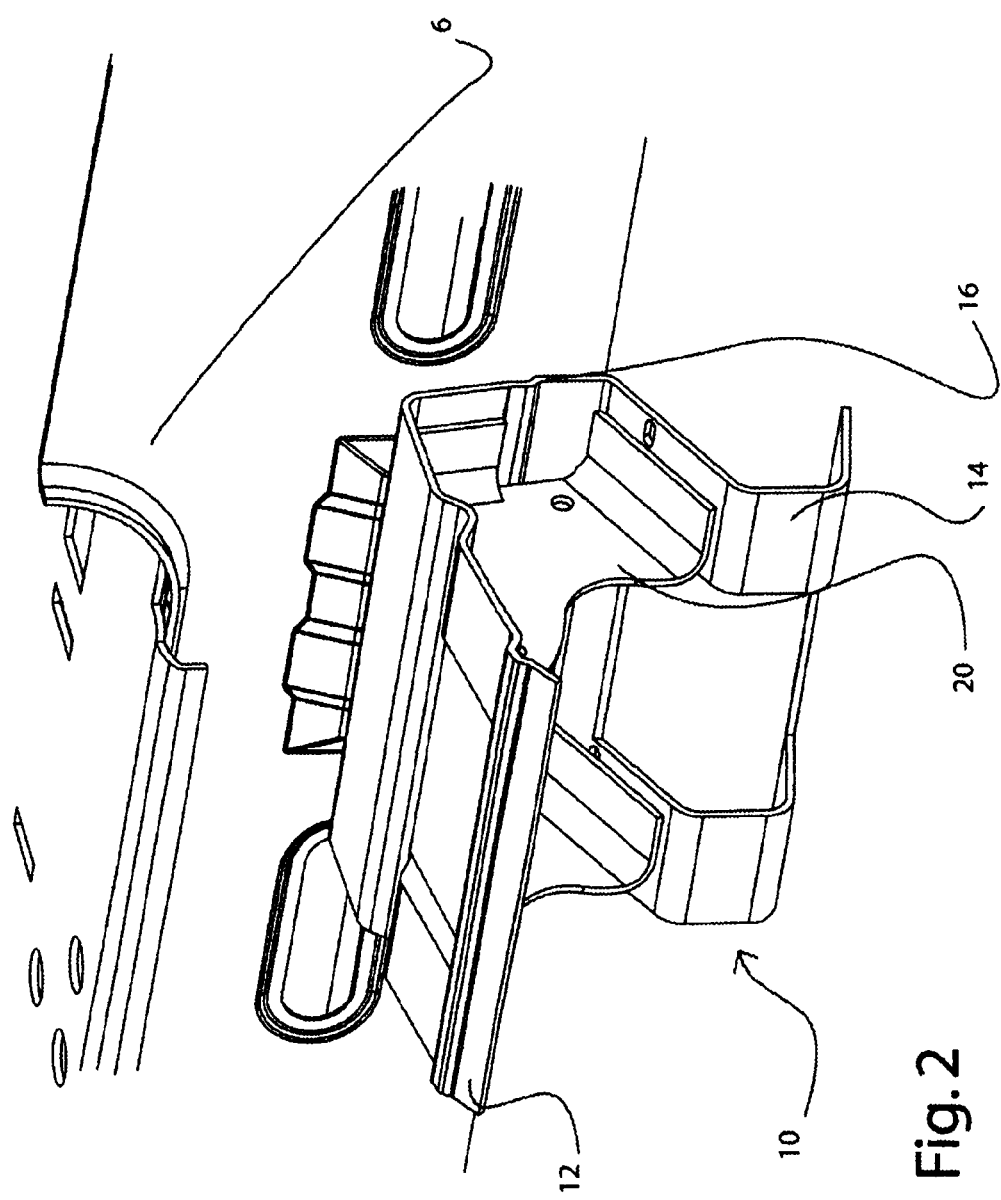
FIG. 2 is a diagrammatic representation of a reinforcing element represented in FIG. 1 as seen from the rear left-hand side of the vehicle.

In the following description, and conforming to an orientation conventionally used in the automotive field, the terms longitudinal, vertical and transverse refer to the axes L, V, T represented in FIG. 1.

As represented in the figures, the rear end of the loading floor 2 is reinforced by an end crossmember 4, transverse to the vehicle, in the form of a hollow body 5 disposed under the floor 2. This hollow body 5 is closed by a crossmember lining 6 with a substantially vertical overall orientation. The end crossmember 4 and the associated lining 6 are welded under the loading floor 2 to stiffen the assembly. At least one bumper reinforcing element 10 is fastened to the crossmember lining 6.

This bumper reinforcing element 10 has a specific shape and is able to absorb both longitudinal impacts to which the bumper 8 is subjected and forces generated by a user bearing down on the bumper 8. Accordingly, an upper part of the reinforcement forms a step area 12 extending over the whole of the longitudinal dimension of the bumper 8, just below the upper part 9 of the bumper, in order to offer a large bearing area.

Figure 3:
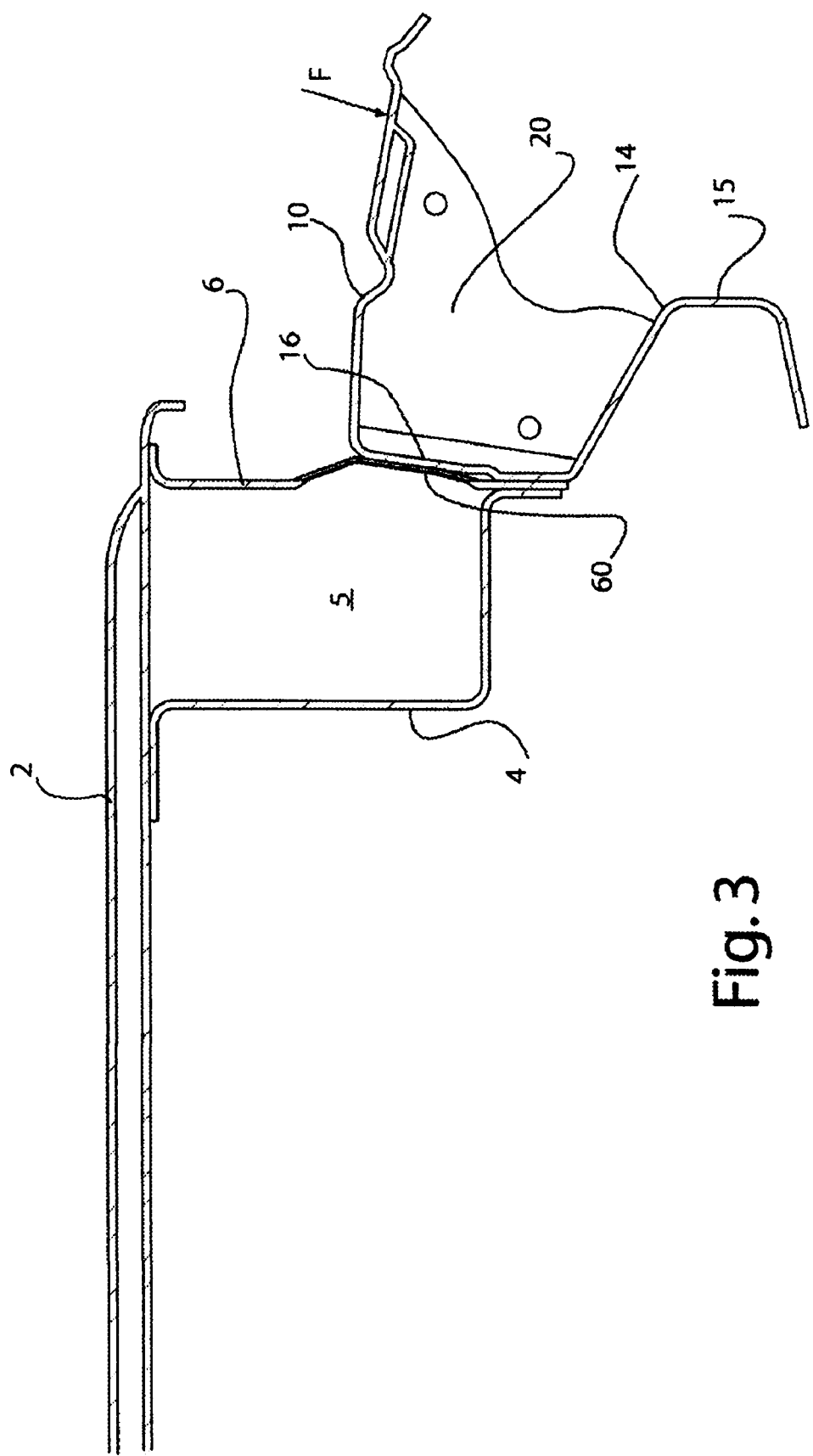
FIG. 3 is a view in section of FIG. 2.
Figure 4:
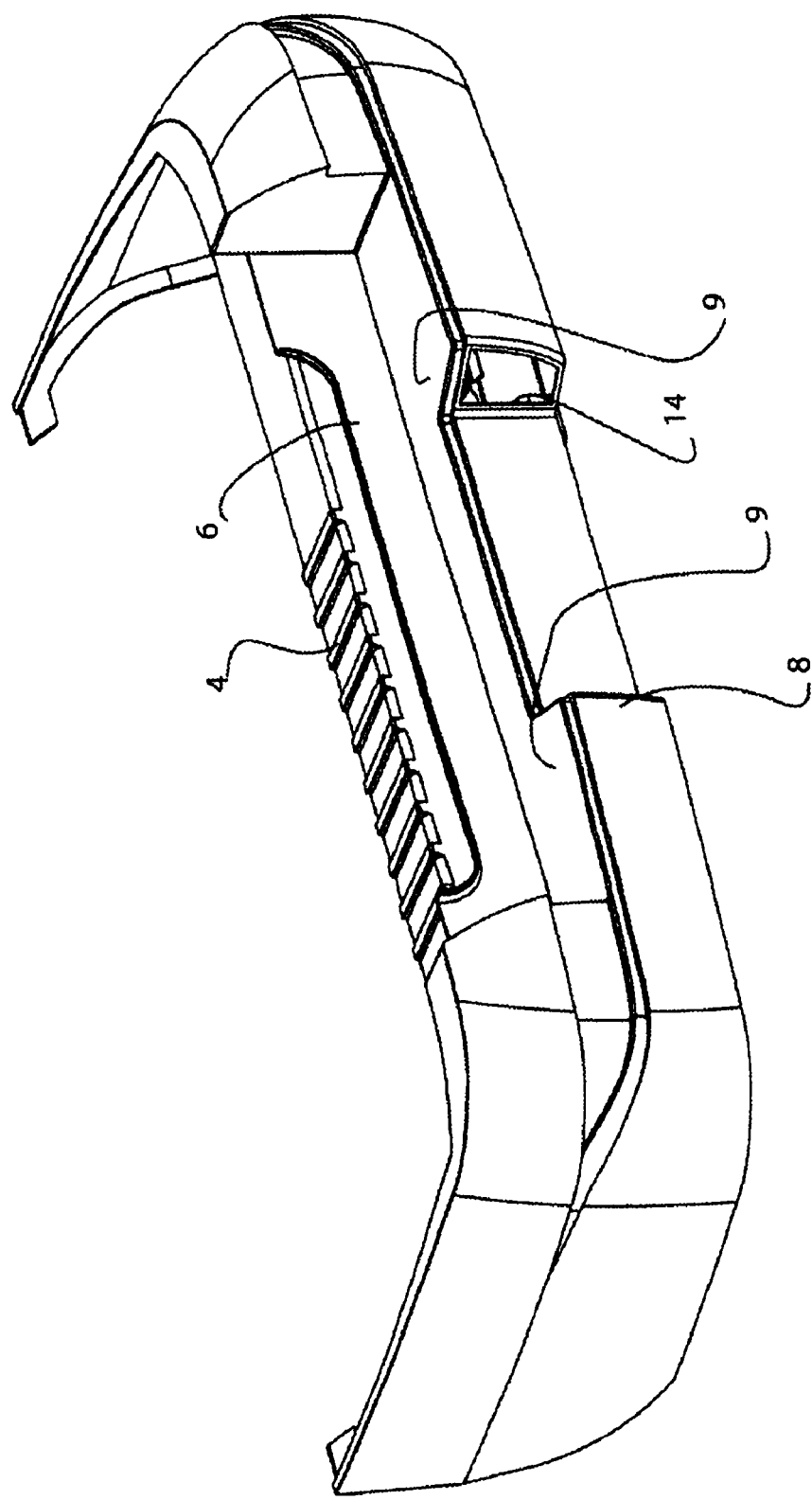
FIG. 4 is a diagrammatic representation equivalent to FIG. 1, showing the bumper.

On the other hand, a lower part of the bumper reinforcement 10 makes it possible to fix the skin of the bumper at its bottom end. This lower part forming a part for attaching the bumper 14 has a substantially U-shaped bridge conformation adapted to absorb longitudinal impacts, the base 15 of the U-shape being oriented toward the rear of the vehicle. As represented in FIG. 3 in particular, the rear end of this attachment part 14 is set back from the rear end of the step area 12, but it is clear that a different bumper design could lead to the bumper reinforcing element 10 having different longitudinal dimensions.

Finally, an intermediate part is connected to the upper part and the lower part to form a one-piece reinforcing element 10 provided with a step area 12, more specifically adapted to absorb vertical forces, and a part for attaching the bumper 14, more specifically adapted to absorb longitudinal forces. This intermediate part forms a part 16 for fixing the reinforcement to the end crossmember lining 6 and is welded to this lining 6. As shown in FIG. 1 or 3, this fixing part 16 is advantageously fastened to an inclined plane 60 of the lining 6.

In accordance with the invention, the fixing plane comprising the inclined plane 60 is substantially parallel to the force F represented by way of example in FIG. 3 and representing a force transmitted by a user bearing down on the bumper 8 like a step.

The orientation of the reinforcing element 10 is designed overall to absorb this force specific to the step and has on the one hand a plane in which the reinforcing element 10 is fixed to the crossmember lining 6 that is inclined relative to the vertical and on the other hand a step area 12 inclined relative to the horizontal plane to be substantially perpendicular to the force F exerted by the user. Thus the orientation of the force absorbing planes is optimized to absorb the forces of the user climbing onto the bed of the vehicle and thus to prevent deformation of the step and long-term deterioration of the bumper 8.

At least one reinforcing bracket 20 is disposed inside the bumper reinforcement element 10 to stiffen it. This bracket 20 is welded under the step area 12 of the bumper reinforcement 10, substantially over all its longitudinal dimension, as well as to the face of the bumper reinforcing member attachment part 14 that faces the upper part of the bumper. This bracket 20 has a free end facing the intermediate part of the bumper reinforcement element 10 to enable absorption of forces in the event of a longitudinal impact.

This architecture makes it possible to satisfy the small impact specifications and thus serves as a crumple zone adapted to prevent deformation of the structure of the vehicle and of the end crossmember lining 6 in the event of a slight impact.

Two bumper reinforcing elements 10 are advantageously fixed to the end crossmember 4, substantially at the lateral ends of this crossmember 4, as represented in FIG. 1. The space between the two reinforcements 10 enables the installation of a number plate. It will nevertheless be understood that the number and the dimensions of the reinforcing elements could vary without departing from the scope of the invention, provided that the section of this reinforcing element absorbs longitudinal forces and vertical forces exerted on the bumper in accordance with the invention.

The invention claimed is:

1. An arrangement for reinforcing a bumper of a motor vehicle, comprising:
   a crossmember; and
   at least one reinforcing element welded to the crossmember, the at least one reinforcing element being configured to support the bumper and to absorb substantially longitudinal forces,
   wherein the at least one reinforcing element includes an upper portion forming a step region that extends below an upper portion of the bumper and is adapted to absorb substantially vertical forces,
   wherein the at least one reinforcing element includes a U-shaped lower part for attaching the bumper adapted to absorb substantially longitudinal forces, and
   wherein the at least one reinforcing element includes a fixing plane directly attached to the crossmember, the fixing plane being positioned between the upper portion and the U-shaped lower part of the at least one reinforcing element.

2. The arrangement according to claim 1, wherein the fixing plane of the at least one reinforcing element is welded to a part forming a lining of the crossmember.

3. The arrangement according to claim 2, wherein the fixing plane of the at least one reinforcing element is welded to an inclined plane on the crossmember lining so that the fixing plane of the at least one reinforcing element is slightly inclined relative to a transverse vertical plane.

4. The arrangement according to claim 1, wherein at least one reinforcing bracket is disposed inside the at least one reinforcing element to stiffen the at least one reinforcing element, the at least one reinforcing bracket being welded under the step region of the at least one reinforcing element and to a face of an attachment part of the at least one reinforcing element that faces an upper part of the least one reinforcing element.

5. The arrangement according to claim 1, wherein the at least one reinforcing element includes two reinforcing elements disposed substantially at lateral ends of the crossmember.

6. An automobile vehicle comprising the arrangement according to claim 5, wherein a number plate is disposed in a space between the two reinforcing elements.

7. The arrangement according to claim 1, wherein the upper portion, the U-shaped lower part, and the fixing plane of the at least one reinforcing element are directly connected to form a one-piece reinforcing element.

8. The arrangement according to claim 4, wherein the at least one reinforcing bracket includes a free end facing and spaced apart from the fixing plane of the at least one reinforcing element.

* * * * *